Oct. 27, 1959  F. D. RECTOR ET AL  2,909,863
FISH LURE AND METHOD OF CONSTRUCTING SAME
Filed Jan. 28, 1958
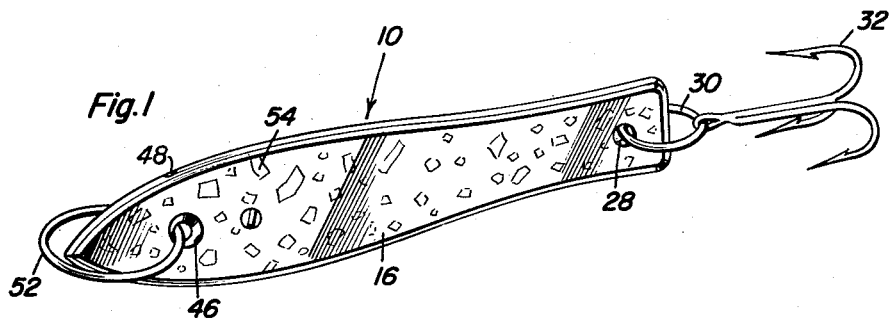
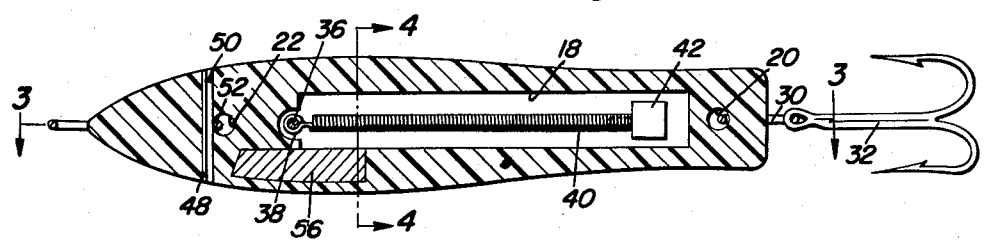
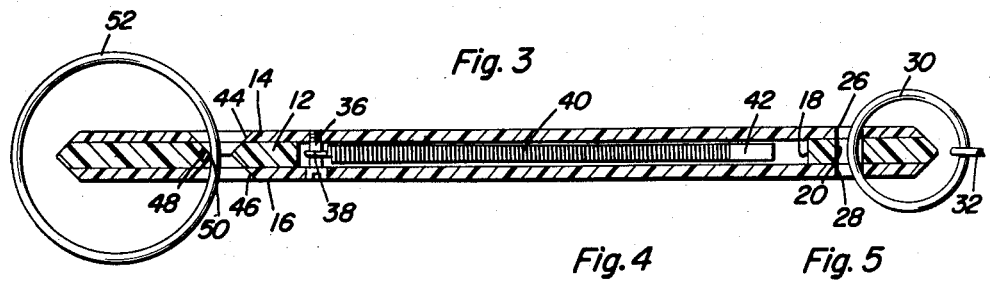
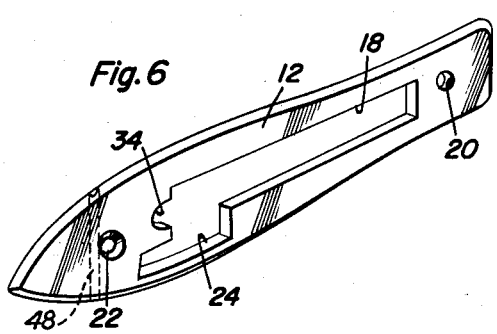
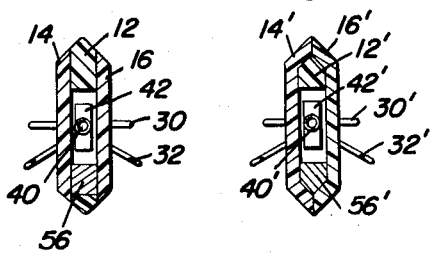
Floyd D. Rector
Mary L. Nichols
INVENTORS
BY *Clarence A. O'Brien*
*and Harvey B. Jackson*
Attorneys

2,909,863
FISH LURE AND METHOD OF CONSTRUCTING SAME

Floyd D. Rector and Mary L. Nichols, Inglewood, Calif.; said Nichols assignor to said Rector Application January 28, 1958, Serial No. 711,590

3 Claims. (Cl. 43—42.31)

The present invention generally relates to a fish lure and more particularly to a novel and improved construction in a fish lure incorporating means for reflecting many various colors to resemble as near as possible the scales which normally appear on fish together with a built-in noise maker or sound producing device for attracting fish.

The primary object of the present invention is to provide a fish lure having embedded in the material from which the device is constructed a plurality of reflectors or reflecting particles of materials for reflecting various colors in many directions simultaneously for closely simulating the appearance of fish scales.

Another very important object of the present invention is to provide a fish lure incorporating in its construction a device for producing a sound for attracting fish.

Yet another feature of the present invention is to provide a fish lure which is attractive, practical and sturdy in construction, and effective for the purposes for which the same is intended.

The present invention incorporates in its construction a core or main body having a noise maker built therein together with side pieces of plastic or similar material having reflectors embedded therein with the fish lure being attached to a lead ring for permitting free motion of the lure for inducing a swimming motion thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the fish lure of the present invention;

Figure 2 is a longitudinal, vertical sectional view of the fish lure illustrating the internal details of construction;

Figure 3 is a longitudinal, sectional view taken substantially upon a plane passing along section line 3—3 of Figure 2;

Figure 4 is a transverse sectional view taken substantially upon a plane passing along section line 4—4 of Figure 2 illustrating one form of construction;

Figure 5 is a sectional view similar to Figure 4 illustrating a modified form of structure; and Figure 6 is a perspective view of the central body member or core.

Referring now specifically to the drawings, the numeral 10 generally designates the fish lure of the present invention which includes a main body portion or core 12 and two side members or outer pieces 14 and 16. The main body portion or core 12 is provided with a longitudinal recess 18 therein and an aperture 20 adjacent the rear edge and an aperture 22 adjacent the front end. The recess 18 is provided with a laterally extending recess 24 adjacent the forward end thereof for receiving a weight 26 for retaining the fish lure 10 generally in vertical relation. The side member 14 is provided with an aperture 26 in alignment with the aperture 20 and the side member 16 is provided with an aperture 28 in alignment with the aperture 20 for receiving a ring 30 to which is mounted a hook 32 which may be of any suitable construction.

The recess 18 is provided with a notch 34 in the forward end thereof for receiving a fastener 36 which extends through and retains the side members 14 and 16 in position. In encircling relation to the fastener 36 is an eye member 38 of an elongated coil spring 40 having a weight 42 mounted on the rear end thereof. The spring 40 is disclosed as being a coil spring but could readily be a straight wire spring or flat steel of suitable strength to operate the weight or hammer 42 which under vibration of swimming motion of the fish lure taps against the sides of the side members 14 and 16 and this rapid tapping noise attracts fish to the lure. The side member 14 is provided with an aperture 44 in alignment with the aperture 22 and the side member 16 is provided with an aperture 46 in alignment with the aperture 22. All of the apertures 44 and 46 and 22 are tapered or countersunk from both sides of the lure and a vertically disposed rigid member 48 is inserted through the main body of the lure in intersecting relation to the front edge of the opening 22 and the member 48 is provided with a knife edge 50 for engagement with a lead ring 52 whereby the ring 52 will ride the knife edge 50 whereby a swimming motion will be provided for the lure 10.

Each side member 14 and 16 is preferably constructed of plastic material having a plurality of reflectors 54 embedded therein whereby the reflectors 54 will reflect various colored light in all directions simultaneously. These reflectors 54 may be metal fragments or fragments of mother-of-pearl or fragments of any other reflective material with the reflected light also serving to attract fish.

In the construction of Figures 1–4, the plastic sides 14 are beveled along the upper and lower edges thereof with the bevel being continuous over the inner core 12 for providing reflective surfaces throughout the periphery of the fish lure.

Figure 5 illustrates a similar construction with the same reference numerals being employed but primed in which the side members 14′ and 16′ are tapered and provide reflective surfaces throughout the periphery of the fish lure. The recess 24 may be provided with weights 56 or wedges 56′ in any manner desired for orientating the fish lure so that it assumes the desired angle to remain vertical when moved through the water.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fish lure comprising a laminate structure defining the shape of a fish and including a longitudinal central core and a pair of longitudinal side members secured to the central core, said side members having a plurality of reflectors embedded therein with each of the members defining the shape of a fish, said reflectors causing reflection of light in various directions for attracting fish, said central core being provided with a recess, a longitudinal spring means mounted within said recess, a weight mounted on the free end of said spring means and adapted to engage the side members in a tapping manner when the lure is pulled through the water and follows a swimming motion thus providing a tapping noise for inducing fish towards the lure.

2. The combination of claim 1 wherein each of said side members and central core is provided with a countersunk aperture adjacent the front end thereof for receiving a lead ring, a vertically extending rigid member intersecting said aperture in said central core and providing a knife edge at the forward edge of said aperture for engagement with the lead ring whereby the fish lure will swivel about the knife edge contact with the lead ring when pulled through the water thus simulating a swimming fish.

3. A fish lure comprising a laminate structure defining the shape of a fish and including a longitudinal central core and a pair of longitudinal side members secured to the central core, said side members defining the shape of a fish, said central core being provided with a recess, a longitudinal spring means mounted within said recess, a weight mounted on the free end of said spring means and adapted to engage the side members in a tapping manner when the lure is pulled through the water and follows a swimming motion thus providing a tapping noise for inducing fish towards the lure.

References Cited in the file of this patent

UNITED STATES PATENTS

| | | |
|---|---|---|
| 2,116,994 | Bear | May 10, 1938 |
| 2,520,444 | Smith | Aug. 29, 1950 |
| 2,563,522 | Fisher | Aug. 7, 1951 |

FOREIGN PATENTS

| | | |
|---|---|---|
| 281,100 | Great Britain | 1927 |